United States Patent [19]

Schaut et al.

[11] Patent Number: 4,619,525
[45] Date of Patent: Oct. 28, 1986

[54] CAMERA CASING FOR MICROFILM CAMERAS

[76] Inventors: Josef Schaut, Freiher von Stein Strasse 8, 6367 Karben 1; Peter Rüppel, Söderweg 39, Bad Nauheim, both of Fed. Rep. of Germany

[21] Appl. No.: 640,330

[22] Filed: Aug. 13, 1984

[30] Foreign Application Priority Data

Aug. 13, 1983 [DE] Fed. Rep. of Germany ....... 3329395

[51] Int. Cl.[4] ................... G03B 27/32; G03B 27/52
[52] U.S. Cl. ........................................ 355/64; 355/72
[58] Field of Search ............... 355/50, 64, 46, 53, 355/72

[56] References Cited

U.S. PATENT DOCUMENTS 2,452,745  11/1948  Getter .............................. 352/136
3,992,088  11/1976  Blanke .............................. 352/123
4,029,412   6/1977  Spence-Bate ....................... 355/64
4,080,063   3/1978  Stemmle ............................ 355/50
4,247,197   1/1981  Oosaka et al. ..................... 355/72

Primary Examiner—Monroe H. Hayes
Attorney, Agent, or Firm—Kurt Kelman

[57] ABSTRACT

The camera case is intended for microfilm cameras. In order to permit filming copy switching directly from punch cards to continuous film strip, the housing of the camera features two film reel holders mounted on either side above the punch card holder. Surmounting this, provision is made for a vertically adjustable film holder element. The punch card holder element is constructed from, and arranged as the vertical positioning path of the film holder element. Two further embodiments consist in the fact that the copy holder element is provided with a film feed channel bounded on its upper side with a suction plate and on its lower side with a shutter, or that within the housing provision is made for two film reel holders capable of joint transverse displacement in relation to the copy conveyor path and/or the optical system.

10 Claims, 8 Drawing Figures

CAMERA CASING FOR MICROFILM CAMERAS

BACKGROUND OF THE INVENTION

This invention concerns a camera case for microfilm cameras, and more specifically a camera case suitable for processing both punch cards and continuous film strip.

DESCRIPTION OF THE STATE OF THE ART

Camera cases arranged on a vertically adjustable column surmounting an artwork table, containing all necessary elements for exposure and processing (developing and drying) of film, including conveyor elements for the feed-through of the film, are known. The copy on the table may be filmed either on a film on individual punch cards or on continuous film strip. Where filming is done on punch cards, it is often desired on grounds of safety to record the copy photographed on punch cards additionally on continuous film so that in case of need the safely stored film strip may be available as a back-up, as for example when a punch card is damaged in the course of its use, or is misplaced or no longer serviceable for any other reason. Among other things, such double filming on punch cards and continuous film strip was heretofore done in such a way that the copy was first filmed on punch cards and subsequently, after exchanging or switching over the camera case, in the same sequence on the continuous film. An exchange of the camera case is necessary whenever one camera case is outfitted solely for the processing of punch cards, and the other for the processing of film reels. Conversely, a switchover is feasible when the camera case affords either mode of operation. The practice includes filming on continuous film strip, after which a duplicate is prepared of such material and/or of the film roll, whose individual frames are cut up and the individual frames are mounted on punch cards. In any event, such double filming constitutes in effect duplication of labor, in that either the entire copy stack with its individual pieces has to be fed twice to the exposure station, or the duplicate of the roll must be remounted on punch cards, which necessarily entails an extra expenditure of time.

SUMMARY OF THE INVENTION

According to one embodiment of this invention two film spools are arranged on either side above the punch card holder in the housing of the camera case. The punch card holder is surmounted by a film holder capable of up-and-down motion and the punch card holder is arranged for displacement into and out of the vertical positioning path of the film holder.

To resolve the same problem, the camera case according to this invention may also be constructed in such a way that within the housing of the camera case, two film spools are mounted for joint transverse motion relative to the feed path of the film stock and/or the optical system, or in such a way that the film stock holder is provided with a channel for the passage of the film, which is bounded on the upper side by a suction plate and on the lower side by a shutter.

These embodiments of the invention make it possible to film the copy placed on the artwork table first on the punch card and immediately thereafter on the continuous film strip, while retaining the ability to film punch cards alone or the continuous film strip alone.

The holders are small plates with suction devices for the film stock, which take up the film stock and press it against a suitably slotted support plate mounted over the optical system, so as to space the filming plane the exact distance away from the optical system. In the first embodiment, the punch card holder needs no mechanical lift since it is pushed downward by the overriding film holder, which is to say that merely the film holder needs a suitable drive mechanism for its vertical adjustment.

In the second embodiment, merely a pressure element is needed for either type of film stock, but the two film spools necessitate a transverse positioning mechanism, as will be explained in greater detail hereinafter.

Lastly, the third embodiment needs merely a suitable distance correction relative to the optical system, which can be readily accomplished, as will also be explained in greater detail hereinafter.

OBJECTS OF THE INVENTION

Such main object of this invention is to provide an improved camera case for a microfilm camera and to outfit it to this end in such a way that double filming can be done much more rationally, that is to say, without the need to switch over or exchange the camera case, as far as the apparatus is concerned, and as far as handling is concerned, without filming the artwork stock first on punch cards and then on continuous film, but rather by having the copy recorded on punch cards and immediately thereafter on continuous film strip.

A further object of the invention is to utilize for the duplicate filming the film and punch card holders that the punch card holder is removed out of its photographing position and in its stead the holder of the continuous film material is brought into photographing position.

Another object of the invention is to utilize for the duplicate filming the film spool carrier of the continuous film strip.

Lastly, it is a further object of the invention to construct the holder for punch cards and the continuous film strip in such a way that the same may be utilized for both filming modes.

Other objects, advantages and novel features of this invention will become manifest from the following detailed description in conjunction with the accompanying drawings.

DESCRIPTION OF PREFERRED EMBODIMENTS

Figure 1:
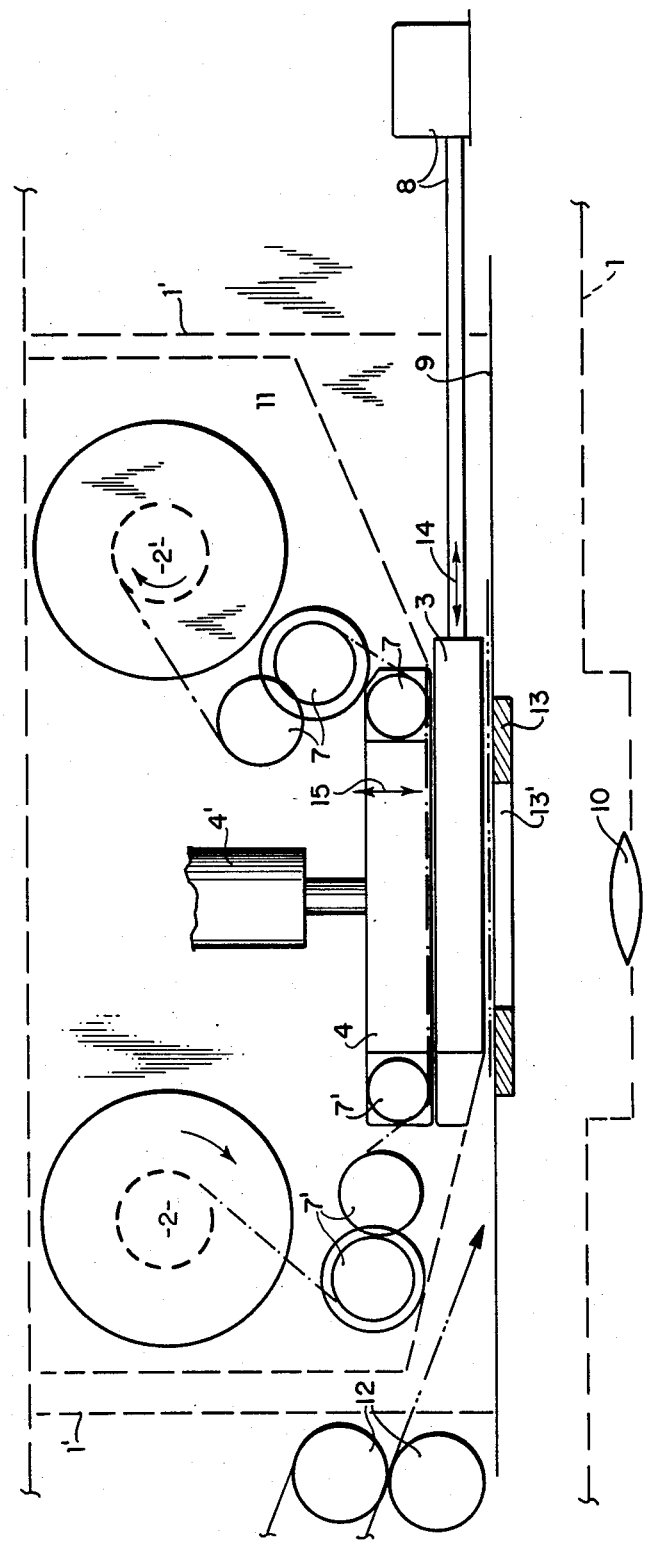
FIG. 1 is a side elevational view of a portion of the camera case according to the first embodiment.

According to FIG. 1, the housing 1 of the camera case (outlined by a broken line) is conventionally outfitted with a lens 10 indicating the optical system at the exposure station through which it it necessary to convey the photographic material (dash-dotted line=film strip; dash-double dotted line=punch cards).

The punch cards are delivered to conveyor path 9 by means of feed elements 12 from a storage magazine not illustrated in the figure.

Figure 8:
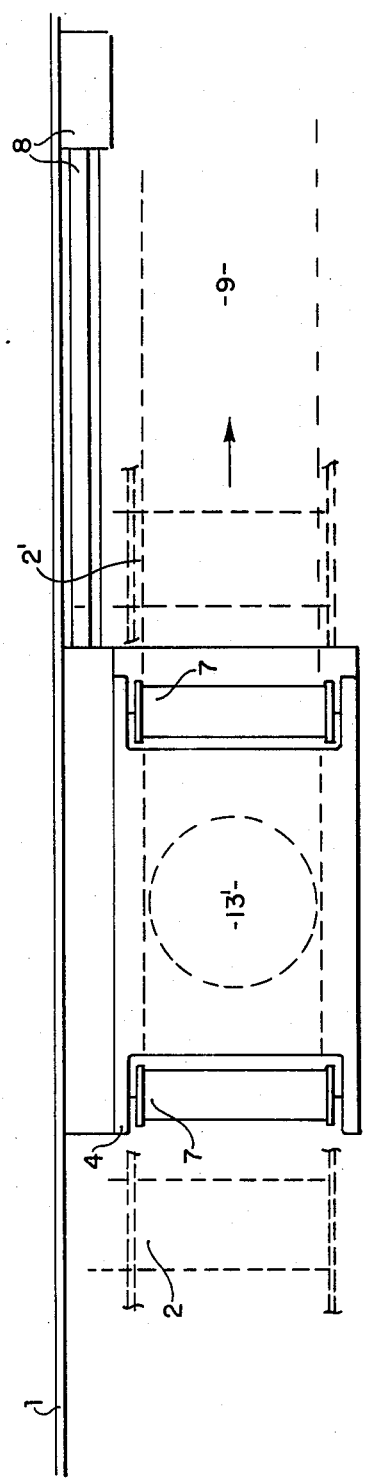
FIG. 8 is an overall view of the microfilm camera.

FIGS. 1, 3, 4 and 5 illustrate only those portions of the camera case that are of interest here, the case as previously mentioned being vertically adjustable over the artwork table (see FIG. 8). Plate 13 with a suitable slot 13' is mounted at the exposure station above optical system 10.

As is customary, provision is made for a punch card holder constructed as a suction plate, which in this embodiment can be displaced back and forth according to the operating cycle. As indicated by the double arrow 14, a suitable drive 8 reciprocates punch card holder 3 in the direction of the conveyor path 9. In addition, a film holder 4 is vertically adjustably mounted above punch card holder 3 for reciprocation in the direction of the double arrow 15 by means of a small positioning cylinder 4' or other suitable drive.

Figure 2:
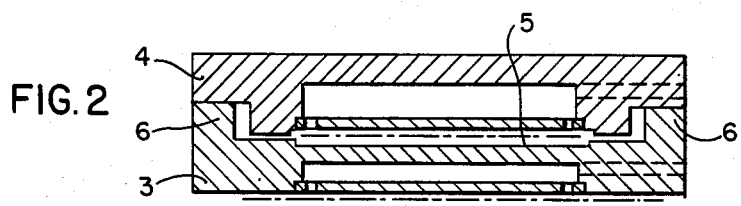
FIG. 2 is a cross-section of the two pressure elements viewed in the direction of travel.

As shown in FIG. 2 (seen in the direction of the feed), the two holders 3, 4 define a gap 5 for the passage of the continuous film strip. The two holders 3, 4 are of course supported by appropriate guides, which are not illustrated and are spaced apart by suitably dimensioned spacers 6 to form the gap 5. The holder 3 may be spring-biased to remain at all times in a raised position until pressed downward by holder 4, when a punch card is to be exposed. Inasmuch as the dotted film strip (shown in dash-dotted lines) remains in the gap between the two holders 3, 4, it is protected from exposure.

As soon as the punch card exposure is accomplished, the punch card holder 3 is displaced in the direction of the feed, carrying with it the punch card (unless the latter was previously removed) and the film holder 4 is pressed downward so that now the copy which has been left in the same location can be optically transferred onto the film strip. As will be readily appreciated from FIG. 1, suitable film feed rollers 7 and 7' are provided for the film feed, the rollers 7' being secured to the holder 4 (see FIG. 3).

All movable elements of the entire camera case are coordinated in their operating cycle and controlled in relation to the relevant exposure. Appropriate means are readily available so that there is no need for further elucidation.

Figure 4:
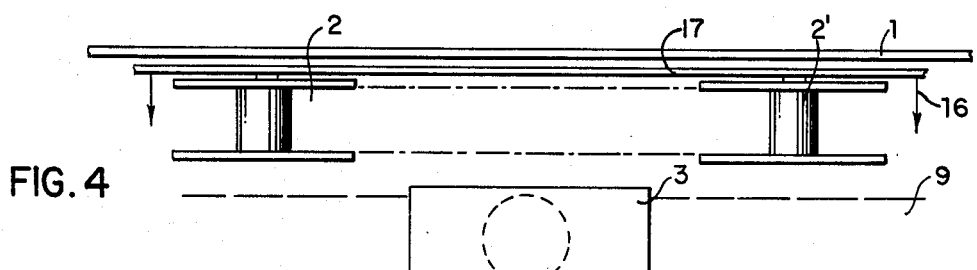
FIG. 4 is a top view of a portion of the camera case constructed according to the second embodiment.
Figure 5:
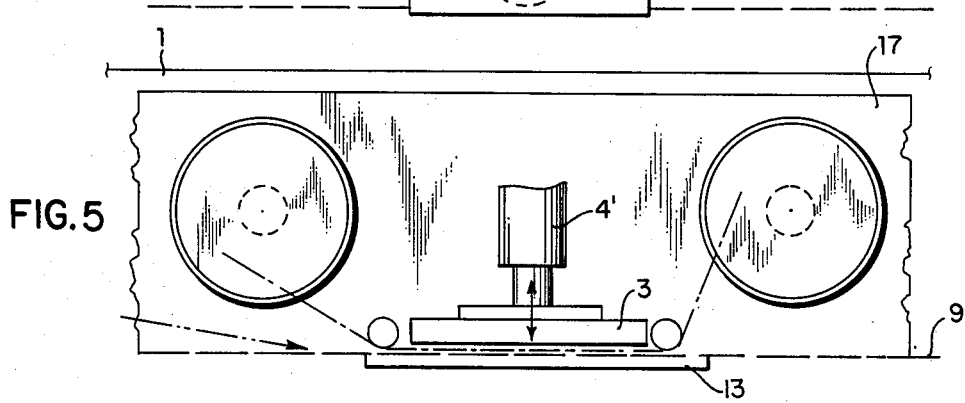
FIG. 5 is a front view of a portion of the camera case according to FIG. 4.

In the second embodiment according to FIGS. 4 and 5, one holder element 3 is used for the punch cards and the film strip. Here, the film spools 2, 2' supported on a carrier 17, which is arranged for transverse displacement toward and out of the conveyor path 9 in the direction of the double arrow 16. Punch card filming is done when the carrier 17 and the spools are in the position shown in FIG. 4. Only the rear wall of camera case 1 is shown in FIG. 4.

Following the exposure of a punch card and its removal from the exposure station, the carrier 17 is displaced together with the two film spools 2, 2' in the direction of the conveyor path 9, whereby the film segment to be exposed is pushed under the holder 3, where it can be pressed down by the same. After exposure, the carrier 17 is once more transversely displaced in the direction of the rear wall of camera case 1 and the next punch card is brought into position for the next copy.

Figure 6:
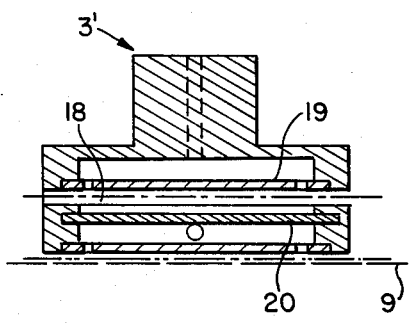
FIG. 6 is a sectional view of a specific embodiment of the retaining device.

In the third embodiment, the film stock holder 3' according to FIG. 6 is provided with a film feed channel 18 bounded on the upper side by a film suction plate 19 and on the lower side by a lightproof shutter 20. When a punch card is exposed this shutter 20 is closed, so that the surmounting film material (dash-dot line) cannot be exposed at the same time. To expose the film material located in the channel 18, the shutter 20 is opened and the distance to the optical system 10 is corrected (FIG. 1), to wit by realigning the lens 10 or by moving the filming plane of the film material into the proper distance, something that could be accomplished as, for example, by making film material support plate 13 adjustable, as shown in FIG. 7, by supporting it on springs.

Figure 7:
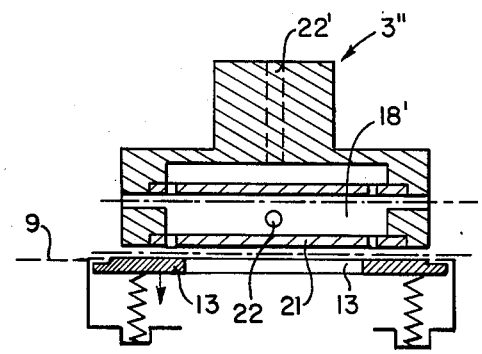
FIG. 7 is a sectional view of the retaining device for a third embodiment.
Figure 3:
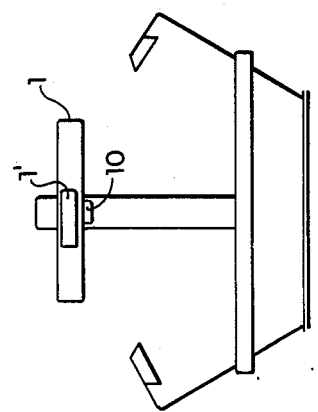
FIG. 3 is a partial top view of the camera case according to FIG. 1.

In utilizing such a combination holder of film material 3', the preferred embodiment is the one illustrated in FIG. 7, as it dispenses with the need for a special shutter 20, as shown in FIG. 6. Its function is assumed by the punch card suction plate 21, which is impermeable to light and adjustable. Moreover, there is no need for distance correction by way of repositioning the optical system 10.

Inasmuch as the film material support plate 13 may be moved between two positions, it is possible to push down the filming plane of the continuous film material (dash-dot line) to the filming plane of the punch cards (dash-double dot line). Inasmuch as the suction plate 21 is not transparent and is suitably removed from the path of the light while the continuous film material is being exposed, it is immune to refraction errors which might occur in an embodiment as illustrated in FIG. 6, though the same could be readily corrected by known methods.

In filming punch cards (with suction plate 21 in position), the suction is provided by attachment 22, and in filming film strip, by attachment 22' (with the suction plate 21 opened or drawn out). For the adjustment of suction plate 21, a drive 8 as suggested in FIG. 1 may be utilized.

In reference to FIG. 1, it is advantageous to provide in camera case 1 a removable light screen box 11 (indicated by a broken line), which screens the entire path of the film material unreeled from spool 2 and taken up by spool 2' from exposure to light when service needs dictate the opening of the service flap 1' (indicated by broken line) of the camera case 1.

FIG. 8 illustrates in principle the overall configuration of the microfilm camera, with which the camera case described here is associated.

We claim:

1. A camera case for a microfilm camera, which comprises
    (a) an exposure station,
    (b) a support plate at the exposure station for supporting a segment of a film for exposure in a filming plane,
    (c) a conveyor for selectively delivering a succession of punch cards to the support plate, each punch card carrying a respective one of the film segments for exposure in the filming plane,
    (d) a punch card holder arranged for reciprocation between an operative position above the support plate for holding a respective one of the punch cards on the support plate and an inoperative position laterally adjacent the support plate,
    (e) two spools mounted above the punch card holder at respective sides thereof and arranged to hold a continuous film strip unreeled from one of the spools and reeled onto the other spool, and (f) a film strip holder arranged above the support plate for reciprocation in a direction extending perpendicularly to the filming plane between an operative position for holding a respective film segment of the film strip on the support plate when the punch card holder is in the inoperative position and an inoperative position above the punch card holder when the punch card holder is in the operative position.

2. The camera case of claim 1, wherein the punch card holder and the film strip holder in the operative position of the punch card holder and the inoperative position of the film strip holder define a gap therebetween permitting the film strip to pass therethrough.

3. The camera case of claim 2, wherein the punch card holder has spacers at opposite edges thereof and the film strip holder rests on the spacers in the operative position of the punch card holder and the inoperative position of the film strip holder.

4. The camera case of claim 1, further comprising film strip feed rollers respectively mounted on the film strip holder at an input side adjacent the spool from which the film strip is unreeled and an output side adjacent the spool onto which the film strip is reeled.

5. The camera case of claim 1, further comprising a service flap on the case for access to the interior of the case on opening the flap and a removable light screening surrounding the film spools and screening the continuous film strip from light upon opening of the flap.

6. A camera case for a microfilm camera, which comprises (a) an exposure station, (b) a support plate at the exposure station for supporting a segment of a film for exposure in a filming plane, (c) a conveyor for selectively delivering a succession of punch cards to the support plate, each punch card carrying a respective one of the film segments for exposure in the filming plane, (d) two spools arranged to hold a continuous film strip unreeled from one of the spools and reeled onto the other spool, (e) a common mount for the two spools, the common mount being arranged for reciprocation between an operative position wherein respective segments of the continuous film strip are in registry with the support plate and an inoperative position wherein the continuous film strip are laterally adjacent the conveyor and the support plate, and (f) a holder arranged above the support plate for reciprocation in a direction extending perpendicularly to the filming plane between an operative position for holding a respective film segment on the support plate and an inoperative position when it permits the selective delivery of respective ones of the punch cards or reciprocation of the spools into the operative position wherein the continuous film strip is in registry with the support plate.

7. The camera case of claim 6, further comprising a service flap on the case for access to the interior of the case on opening the flap and a removable light screening surrounding the film spools and screening the continuous film strip from light upon opening of the flap.

8. A camera case for a microfilm camera, which comprises (a) an exposure station, (b) a support plate at the exposure station for supporting a segment of a film for exposure in a filming plane, (c) a conveyor for selectively delivering a succession of punch cards to the support plate, each punch card carrying a respective one of the film segments for exposure in the filming plane, (d) two spools arranged to hold a continuous film strip unreeled from one of the spools and reeled onto the other spool in a path exposing successive segments of the film strip for exposure in the filming plane, (e) a holder for holding respective ones of the film segments in the filming plane, the holder defining a channel in the path of the film strip for passage thereof, the channel being defined between (1) an upper suction plate for holding the continuous film strip in position and (2) a lower shutter adjacent the support plate for selective operation to expose a respective one of the continuous strip segments.

9. The camera case of claim 8, wherein the lower shutter is constituted by another suction plate for holding a respective one of the punch cards in position.

10. The camera case of claim 9, further comprising a service flap on the case for access to the interior of the case on opening the flap and a removable light screening surrounding the film spools and screening the continuous film strip from light upon opening of the flap.

* * * * *